United States Patent [19]

Nogueira et al.

[11] Patent Number: 4,610,723
[45] Date of Patent: Sep. 9, 1986

[54] PROCESS FOR LEACHING SULPHIDE CONCENTRATES OF THE TETRAHEDRITE TYPE CONTAINING HIGH CONCENTRATIONS OF ARSENIC AND ANTIMONY

[76] Inventors: Eduardo D. Nogueira, Avda. del Mediterraneo 47, 28007-Madrid; Angel L. Redondo Abad, Marcenado 19, 28002-Madrid, both of Spain

[21] Appl. No.: 656,740

[22] Filed: Oct. 1, 1984

[30] Foreign Application Priority Data

Oct. 4, 1983 [ES] Spain ............................ 526.235

[51] Int. Cl.$^4$ ............................................ C22B 15/00
[52] U.S. Cl. .................................... 75/101 R; 423/36; 423/87; 423/42; 423/45; 423/602; 423/617; 75/108; 75/109; 75/115; 75/117; 75/121
[58] Field of Search ............... 423/36, 87, 42, 602, 423/45, 617; 75/101 R, 108, 109, 117, 115, 121

[56] References Cited

U.S. PATENT DOCUMENTS

| | | | |
|---|---|---|---|
| 2,686,114 | 8/1954 | McGauley et al. | 423/36 |
| 3,218,161 | 11/1965 | Kunda | 75/118 R |
| 3,709,680 | 1/1973 | Holmes et al. | 75/121 |
| 3,891,522 | 6/1975 | McKay | 423/36 |
| 3,911,078 | 10/1975 | Nadkarni et al. | 423/27 |
| 3,957,602 | 5/1976 | Johnson et al. | 423/36 |
| 3,964,901 | 6/1976 | Swinkels et al. | 423/87 |
| 3,969,202 | 7/1976 | Albrethsen et al. | 423/87 |
| 4,220,627 | 9/1980 | Fugleberg et al. | 423/87 |
| 4,438,079 | 3/1984 | Nakano et al. | 423/87 |

*Primary Examiner*—John Doll
*Assistant Examiner*—Robert L. Stoll

[57] ABSTRACT

A process for lixiviation of concentrates of copper sulphides of tetrahedral type containing high concentration of arsenic and antimony to recover copper and noble metals. The concentrates are repulped into an aqueous ferrous sulphate solution with an established and controlled solid-liquid ratio which is thereafter oxidized by an oxygen containing gas in a reactor, thereby oxidizing the sulphides to sulphates, precipitating iron as ferric arsenates and antimoniates and yielding a lixiviation pulp in which the solid phase contains the iron, antimony and arsenic as well as the insoluble sulphates of the non-ferrous metals, such as lead and noble metals, and the liquid phase containing the copper, free sulphuric acid and the soluble sulphates of non-ferrous metals, as well as zinc, cadmium, cobalt, etc. The metals contained therein are recovered, after solid-liquid separation by conventional method. Among them, the copper cementation with scrap iron from the lixiviation liquid is the preferable method, because it yields the necessary aqueous solution of ferrous sulphate for the lixiviation.

8 Claims, No Drawings

PROCESS FOR LEACHING SULPHIDE CONCENTRATES OF THE TETRAHEDRITE TYPE CONTAINING HIGH CONCENTRATIONS OF ARSENIC AND ANTIMONY

The present application of invention patent concerns with the hydrometallurgic treatment of concentrates of copper sulphides of the tetrahedral type which contain antimony and arsenic at high concentrations, for the recovery of copper and noble metals.

This type of copper concentrate, characterized by the high content of arsenic and antimony is heavily punished when it is accepted by the conventional foundries.

On the other side, the principal part of copper in this type of concentrate is present as tetrahedrite, which involves to be very refractory under the conventional hydrometallurgic treatments.

The treatment which is here proposed consists in a lixiviation in aqueous medium at a temperature higher than the melting point of sulphur and for low density of pulp, in which a ferrous sulphate solution is used as lixiviating medium, and which purpose is the almost total dissolution of copper from the concentrate and the antimony and arsenic precipitation as iron antimoniates and arsenates, thus producing a rich liquour which contains the copper and sulphuric acid as also the sulphates of the soluble non ferrous metals as zinc, cadmium, cobalt, etc., by which all the metals contained can be recovered after arsenic precipitation and the solution pH settle by conventional methods being the cementation of copper with scrap iron the preferable since it produces the aqueous ferrous solution necessary for the lixiviation; which residue, mainly formed by ferric antimoniate and arsenate, contains the whole silver from the concentrate, which is recovered by lixiviation in sodium chloride solution followed by cementation of the liquid with zinc powder giving place to silver cement.

The lixiviation of the concentrate consists in its dispersion into a ferrous sulphate solution for producing a pulp of solid—with fixed and under control density followed by oxidation of that pulp by means of a gas containing oxygen inside a pressured reactor with stirring.

The ferrous sulphate solution must be to an iron concentration within 1 and 50 g/l, according to the richness of antimony and arsenic existing in the copper concentrate, thus the mass ratio Fe/(As+Sb) is higher than 0.5 and preferably 1.5.

The pulp density of lixiviation is adjusted depending on the iron concentration in the ferrous sulphate solution, using always quantities higher than 40 Kg of solid by cubic meter of solution but preferably employing 100 Kg/m$^3$. This last value improves the energetic balance of the treatment.

The pulp oxidation temperature must be maintained between 140° and 250° C. and preferably at 220±10° C.

The working pressure is adjusted considering that is necessary to maintain the partial pressure of oxygen higher than 300 KPAS and preferably 600±100 KPAS.

The gas preferably employed in the reaction is oxygen, though air and air enriched with oxygen can be also employed.

During the course of oxidation is necessary to maintain an intense stirring conditions, thus enough dispersion in the oxidizing-gas phase into the liquid phase is achieved, avoiding that the solution of oxygen into the liquid to be the controlling step from the kinetic point of view.

The necessary reaction time to complete the oxidizing reaction from sulphides to sulphates, and precipitation of ferric antimoniates, ferric arsenate and ferric oxide are within a minimum of 30 minutes, with a preferably value of 60 minutes. Therefore the stay time in the reactor will be the equivalent to the mentioned reaction time.

The equipment inside of which the reaction takes place may be a horizontal reactor of compartmented type or a cascade vertical-type, which can be stirred mechanically or by gas, and can be continuous or discontinuous, though the cost of the process probably will be lower with the continuous type.

In these conditions the following main reactions take place:

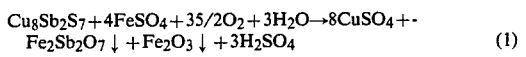   (1)

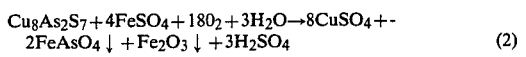   (2)

In this manner copper may be dissolved in aqueous medium with a yield higher than 95%.

Silver remains in the solid residue together with antimonium, arsenic and iron. That residue is highly crystaline wherefore can be easily decanted and filtered.

The copious liqueur with a residual sulphuric acidity within 15 and 30 g/l, with less than 0.3 g/l of iron and with 0.5 to 3.0 of arsenic, can be submited to a precipitation treatment of arsenic and later fitting of pH with an alkali. The resulting liquid is wholly adequated for recovering the copper either by extraction by solvents or by cementation with scrap iron, though this later technique has the advantage to supply to the solution the necessary iron so that can be recycled to the lixiviation of the concentrate.

The residue of the lixiviation is treated with a sodium-chloride solution, for giving place to a chloruret complex of silver (AgCl$_2$+, AgCl$_3$$^{2+}$). The solubleness yield in this step is higher than 95%. After the copious liqueur have been removed from the lixiviation residue the cementation is initiated using zinc powder as reducing agent. The obtained product is a cement with a high silver content.

Several non limitative examples of lixiviation are afterwards given; by which will be possible to define clearly the parameters of the process in the present invention.

The equipment used in the essays are a laboratory reactor of 3.78 l, built in AISI 316L and titanium, with mechanical stirring, electrical sheet heating system, water cooling system through coil, temperature and pressure by automatic control, etc.

EXAMPLE 1

Influence of the Iron Concentration

These essays are good to determine the influence of the iron concentration and the mass balance Fe/(As+Sb), in the results of the treatment. The values of the conditions established for the essays are the following: Pulp density: 60 Kg/m$^3$; temperature: 220° C.; oxygen pressure: 600 KPAS; reaction time: 60 min.; stirring speed: 1300 rpm; concentrate composition: (in percentages) Cu 26.5; Ag 0.27; Sb 13.2; As 6.8; Fe 2.0; Zn 2.9, and S 19.4.

The results obtained are briefly shown in Table I:

| Test no | Iron conc. (g/l) | Mass balance (Fe/As + Sb) | Lixiviation yield (Cu %) | (Zn %) | solub. in brine (Ag %) |
|---|---|---|---|---|---|
| 1 | 12.8 | 1.05 | 92.7 | 94.2 | 96.2 |
| 2 | 18.3 | 1.50 | 95.4 | 95.0 | 95.4 |
| 3 | 25.6 | 2.10 | 97.3 | 95.6 | 92.3 |

As the iron concentration and consequently the mass balance Fe/(As+Sb) increases, the copper and zinc lixiviation also increases and the silver into brine solubility diminishes.

EXAMPLE 2

Influence of the Pulp Density

These tests are adequated to determine the influence of the pulp density in the results of the treatment.

The values of the established conditions for the experiments are the following:

Temperature: 220° C.; oxygen pressure: 600 KPAS; reaction time: 60 min.; stirring speed: 1300 rpm; iron in liquid: 12.8 g/l; concentrate composition (in percentages): Cu 26.5; Ag 0.27; Sb 13.2; As 6.8; Fe 2.0; Zn 2.9, and S 19.4.

The obtained results are shown in Table II:

| Test no | Pulp density solid/solution Kg/m$^3$ | Lixiviation yield (Cu %) | (Zn %) | Solubiliness in brine (Ag %) |
|---|---|---|---|---|
| 1 | 60 | 92.7 | 94.2 | 96.2 |
| 2 | 80 | 91.5 | 94.0 | 97.1 |
| 3 | 100 | 89.4 | 94.2 | 98.4 |

As the pulp density increases, the copper lixiviation yield diminishes and the silver solubiliness into brine increases.

EXAMPLE 3

Influence of Temperature

These experiments are good to determine the influence of temperature in the results of the treatment.

The values of the established conditions for the experiments are the following:

Pulp density: 100 Kg/m$^3$; oxygen pressure: 600 KPAS; reaction time: 60 min.; stirring speed: 1300 rpm; iron in liquid: 21.3 g/l; concentrate composition (in percentage): Cu 26.5; Ag 0.27; Sb 13.2; As 6.8; Fe 2.0; Zn 2.9, and S 19.4.

The results obtained are shown in Table III:

| Test no | Temperature (°C.) | Lixiviation yield (Cu %) | (Zn %) | Solubilyness in brine (Ag %) |
|---|---|---|---|---|
| 1 | 180 | 76.5 | 90.1 | 90.5 |
| 2 | 220 | 92.1 | 93.5 | 95.2 |

As temperature increases, the copper and zinc lixiviation yield and the solubilyness of silver in brine also increases.

EXAMPLE 4

Influence of the Partial Pressure of Oxygen

These essays are useful to determine the influence of the partial pressure of oxygen on the results of the treatment.

The values of the established conditions used in the essays are the following:

Pulp density: 60 Kg/m$^3$; temperature: 220° C.; reaction time: 60 min.; stirring speed: 1300 rpm; iron in liquid: 25.6 g/l; composition of the concentrate (in percentage): Cu 26.5; Ag 0.27; Sb 13.2; As 6.8; Fe 2.0; Zn 2.9, and S 19.4.

The results obtained are briefly shown in Table IV:

| Test no | Oxygen part. pres. (KPAS) | Yield of lixiviation (Cu %) | (Zn %) | Brine solubleness (Ag %) |
|---|---|---|---|---|
| 1 | 300 | 95.8 | 94.7 | 91.0 |
| 2 | 600 | 97.3 | 95.6 | 92.3 |

When the partial pressure of oxygen increases the recoveries of copper, zinc and silver also increase.

EXAMPLE 5

Influence of the Stirring Rate

These essays are useful to determine the influence of the stirring rate on the results of the treatment.

The values of the established conditions for the essays are the following: Pulp density: 100 Kg/m$^3$; temperature: 220° C.; oxygen pressure: 600 KPAS; reaction time: 60 min.; iron in liquid: 21.3 g/l; composition of the concentrate (in percentage): Cu 26.5; Ag 0.27; Sb 13.2; As 6.8; Fe 2.0; Zn 2.9, and S 19.4.

The results obtained are shown in Table V:

| Test no | Stirring rate (rpm) | Yield of lixiviation (Cu %) | (Zn %) | Brine solubleness (Ag %) |
|---|---|---|---|---|
| 1 | 900 | 90.8 | 92.1 | 94.7 |
| 2 | 1300 | 92.1 | 93.5 | 95.2 |

When the stirring rate increases the recoveries of copper, zinc and silver rise.

EXAMPLE 6

Influence of the Reaction Time

These essays are useful to determine the influence of the reaction time on the results of the treatment.

The values of the established conditions used in the experiments are the following:

Pulp density: 60 Kg/m$^3$; temperature 220° C.; oxygen pressure: 600 KPAS; stirring speed: 1300 rpm; iron in liquid: 12.8 g/l; composition of the concentrate (in percentages): Cu 26.5; Ag 0.27; Sb 13.2; As 6.8; Fe 2.0; Zn 2.9, and S 19.4.

The results obtained are shown in Table VI:

| Test no | Reaction time (min.) | Yield of lixiviation (Cu %) | (Zn %) | Brine solubleness (Ag %) |
|---|---|---|---|---|
| 1 | 40 | 87.9 | 93.4 | 90.3 |
| 2 | 60 | 92.7 | 94.2 | 96.2 |

As can be seen when the reaction time increases the recoveries of copper, zinc and silver rise.

What we claim is:

1. A process for leaching tetrahedrite copper sulphide concentrates containing arsenic and antimony which comprises: slurrying the tetrahedrite copper concentrate in a ferrous sulphate aqueous solution to obtain a solid-liquid ratio higher than 40 Kg of solids per cubic meter of solution; subjecting said slurry to an oxidation leach in a stirred pressure reactor at an oxygen partial pressure higher than 3 Kg/cm$^2$ and a temperature in the range of from 140° C. to 250° C. for complete oxidation of metal sulphides to sulphates and precipitation of iron as ferric arseniate and ferric antimoniate; separating the reaction mixture into a solid residue containing the ferric arseniate and ferric antimoniate and insoluble non-ferrous metal sulphates, and a leach liquor containing sulphuric acid, and copper sulphate; and recovering the metal from the leach liquor and from the solid residue.

2. A process according to claim 1 wherein the iron concentration in the ferrous sulphate leaching solution is in the range of from 1 to 50 grams per liter, and the mass ratio of iron to arsenic plus antimony is above 0.5.

3. A process according to claim 1 wherein the solid-liquid ratio of the leaching slurry is from 60 to 100 Kg of tetrahedrite copper concentrate per cubic meter of ferrous sulphate leaching solution.

4. A process according to claim 1 wherein the oxidation leach reaction of the tetrahedrite copper concentrate slurry in ferrous sulphate solution is carried out at a temperature of from 210° C. to 230° C.

5. A process according to claim 1 wherein the oxidation leach reaction of the tetrahedrite copper concentrate slurry in ferrous sulphate solution is carried out at constant pressure with an oxygen partial pressure of from about 5 to about 7 Kg/cm$^2$.

6. A process according to claim 1 wherein the oxidation leach reaction of the tetrahedrite concentrate slurry in ferrous sulphate solution is carried out with stirring to produce a dispersion of the oxygen in the reacting slurry.

7. A process according to claim 1 wherein the conditions of oxidation leach reaction of the tetrahedrite concentrate slurry in ferrous sulphate solution are constant not only until all the metal sulphides are oxidized to sulphates but also until all the iron is precipitated as ferric arseniate, ferric antimoniate, and ferric oxide, which is achieved in a residence time equivalent to a reaction time in the range of from about 30 to 60 minutes.

8. A process according to claim 1 wherein the step of recovering said metals comprises introducing scrap iron into said resultant leach liquor containing sulphuric acid and copper sulphate to produce cementation of said copper and to yield an aqueous solution comprising ferrous sulphate, and recycling said ferrous sulphate solution for use in said step of slurrying tetrahedrite copper.

* * * * *